United States Patent [19]

Luciani et al.

[11] Patent Number: 5,173,465
[45] Date of Patent: Dec. 22, 1992

[54] METHOD FOR PREPARING A SOLID CATALYST COMPONENT FOR ETHYLENE (CO)POLYMERIZATION

[75] Inventors: Luciano Luciani, Ferrara; Maddalena Pondrelli, Budrio; Renzo Invernizzi, Milan, all of Italy

[73] Assignee: Montedipe S.r.l., Milan, Italy

[21] Appl. No.: 715,788

[22] Filed: Jun. 14, 1991

[30] Foreign Application Priority Data

Jun. 22, 1990 [IT] Italy .................. 20740 A/90

[51] Int. Cl.$^5$ .............................................. C08F 4/02
[52] U.S. Cl. ...................... 502/107; 502/103; 502/104; 502/119; 502/120; 502/125; 526/119; 526/126
[58] Field of Search ............... 526/119, 126; 502/119, 502/104, 103, 107, 120, 125

[56] References Cited

U.S. PATENT DOCUMENTS 4,421,674  12/1983  Invernizzi ........................ 502/154
4,467,044   8/1984  Band ................................ 502/111
4,477,588  10/1984  Hawley ........................... 502/119

FOREIGN PATENT DOCUMENTS 274099  7/1988  European Pat. Off. .

Primary Examiner—Joseph L. Schofer
Assistant Examiner—David Wu
Attorney, Agent, or Firm—Shea & Gould

[57] ABSTRACT

A solid catalyst component for ethylene (co)polymerization, consisting of a particulate silica support and a catalytically active part containing titanium, magnesium, chlorine and alkoxy groups is obtained by a) preparing a solution of magnesium chloride in ethanol; b) impregnating particulate silica with said solution; c) eliminating the unabsorbed ethanol from the suspension; d) eliminating absorbed ethanol from the solid; e) interacting the resultant solid with a titanium chloride, alkoxide or chloroalkoxide; and possibly interacting with an alkylaluminium chloride. In a preferred embodiment in stage e), a silicon halide is added to improve the catalyst activity.

21 Claims, No Drawings

METHOD FOR PREPARING A SOLID CATALYST COMPONENT FOR ETHYLENE (CO)POLYMERIZATION

This invention relates to a solid catalyst component, the process for its preparation and its use in processes for the polymerization of ethylene and the copolymerization of ethylene with an alpha olefin.

It is known that ethylene or general alpha-olefins can be polymerized by the low pressure process with Ziegler-Natta catalysts. These catalysts are generally formed from a compound of group IV to group VI elements of the periodic table (transition metal compounds) mixed with an organometallic compound or hydride of group I to group III elements of the periodic table.

Catalysts are also known in the art in which the transition metal compound is fixed to a solid organic or inorganic support possibly treated physically and/or chemically. Examples of such solid supports are the oxygenated compounds of the bivalent metals (such as oxides, oxygenated and carboxylated inorganic salts) or hydroxychlorides or chlorides of bivalent metals. According to U.S. Pat. No. 3,642,746, a catalyst support is a bivalent metal halide treated with an electron donor. According to the description of U.S. Pat. No. 4,421,674, a catalyst support is the solid but flowable product obtained by spray-drying a solution of magnesium chloride in ethanol. In particular, according to U.S. Pat. No. 4,421,674, microspheroidal particles of a solid such as silica can be suspended in ethanolic magnesium chloride solution to obtain a catalyst support of spherical form having a core formed from the microspheroidal solid, coated with a layer of activated magnesium chloride.

It has now been found possible to obtain solid Ziegler-Natta catalyst components on a support prepared from microspheroidal silica and a solution of magnesium chloride in ethanol, by a simple and convenient process which on the one hand overcomes the difficulties and complications inherent in a spray drying operation and on the other hand enables solid catalyst components to be obtained having improved activity in ethylene (co)polymerization processes.

In accordance therewith the present invention provides a process for preparing a solid catalyst component for ethylene polymerization and for the copolymerization of ethylene with an alpha-olefin, consisting of a silica support in particle form (50-90% by weight) and a catalytically active part (50-10% by weight) containing titanium, magnesium, chlorine and alkoxy groups, said process being characterised by:

a) preparing a solution of magnesium chloride in ethanol;

b) impregnating silica particles with the solution from a) by suspending the silica particles in the solution;

c) eliminating the ethanol not absorbed by the suspension in b) by evaporation at a temperature not exceeding 60° C. and recovering a solid in the form of particles containing ethanol and magnesium chloride in a molar ratio of the order of 5/1-6/1;

d) heating the solid from c) to a temperature not exceeding 150° C. and partially eliminating the absorbed ethanol by evaporation to a molar ratio of ethanol to magnesium chloride in the solid of between 1.5/1 and 4/1;

e) interacting the solid from d) with at least one titanium compound chosen from titanium chlorides, alkoxides and chloroalkoxides to an atomic ratio of magnesium to titanium in the solid of between 0.5/1 and 8/1;

f) possibly interacting the solid from e) with an alkylaluminium chloride to an atomic ratio of chlorine to titanium in the solid of between 10/1 and 16/1;

g) recovering the solid catalyst component.

In stage a) of the process of the present invention a solution of magnesium chloride in ethanol is prepared. For this purpose an anhydrous magnesium chloride or a substantially anhydrous magnesium chloride is preferably used, by "substantially" there being meant a water content of less than about 5% by weight. Likewise the ethanol is preferably anhydrous or can have a small water content, which in any event is less than 5% by weight. The magnesium chloride can be dissolved either at ambient temperature (20° C.-25° C.) or at a higher than ambient temperature up to the reflux temperature of ethanol at atmospheric pressure. In the preferred embodiment a temperature of between about 60° C. and the ethanol reflux temperature is used, to prepare ethanolic solutions with a magnesium chloride concentration of between 1 and 15% by weight in ethanol. In stage b) of the process of the present invention, particulate silica is impregnated with the solution originating from a) by suspending the silica particles in the solution.

The silica suitable for this purpose is a porous microspheroidal silica having a particle size of between 10 and 100 $\mu$m, an $SiO_2$ content > 90% by weight, a surface area of between 250 and 400 $m^2/g$, a pore volume of between 1.3 and 1.8 ml/g, and a mean pore diameter of between 20 and 30 nm. In the preferred embodiment a microspheroidal silica is used having a particle size of between 10 and 100 $\mu$m, an $SiO_2$ content > 99% by weight, a surface area of between 300 and 340 $m^2/g$, a pore volume of between 1.5 and 1.7 ml/g, and a mean pore diameter of between 24 and 27 nm. The silica can be either used as such or undergo activation treatment before impregnation. Such activation can be effected by heating the silica in an inert atmosphere to a temperature of between about 100° C. and 650° C. for a time of between 1 and 20 hours, or by bringing the silica into contact with an organometallic compound (for example a magnesium alkyl such as magnesium butyl, or aluminium triethyl), operating at ambient temperature or at higher than ambient temperature up to about 100° C. In the preferred embodiment a silica activated by heating in an inert atmosphere (nitrogen) to a temperature of the order of 600° C. for a time of about 10 hours is used.

The impregnation is conveniently effected by suspending between 10 and 20 parts by weight of silica per 100 parts by volume of the ethanolic magnesium chloride solution, and maintaining contact possibly under slight stirring at a temperature of between ambient (20°-25° C.) and a temperature close to the ethanol boiling point and preferably at about 50°-65° C., for a time of between 0.5 and 2.0 hours.

According to the present invention stage c) of the process is effected by eliminating the unabsorbed ethanol from the suspension by evaporation at a temperature not exceeding 60° C. and generally between 30° and 60° C., operating at atmospheric pressure or at a reduced pressure down to about 1 mmHg. Under these conditions a particulate solid is recovered containing ethanol and magnesium chloride in a molar ratio of the order of 5/1-6/1.

Such a solid is heated in stage d) to partially eliminate absorbed ethanol by evaporation, until the molar ratio of ethanol to magnesium chloride in the solid is between 1.5/1 and 4/1. For this purpose the solid is heated to a temperature not exceeding 150° C., at atmospheric pressure or under reduced pressure down to 1 mmHg, for a time of between about 0.5 and about 5 hours. In the preferred embodiment the solid is heated to a temperature of the order of 120° C. for about 1 hour, so as to partially evaporate the absorbed ethanol and obtain a solid in which the molar ratio of ethanol to magnesium chloride is between 2.0/1 and 3.5/1.

According to the present invention, in stage e) of the process the solid originating from d) is interacted with at least one titanium compound chosen from chlorides, alkoxides and chloroalkoxides. Titanium compounds suitable for this purpose are titanium tetrachloride, titanium tetra-n-propoxy, titanium tetra-n-butoxy, titanium tetra-i-propoxy, titanium tetra-i-butoxy, and the corresponding titanium mono- or di-chloroalkoxides. The procedure is carried out with the titanium compound dissolved in an inert vehicle, especially an aliphatic hydrocarbon which is liquid under the operating conditions, such as pentane, hexane, heptane, octane, nonane and decane. The most low-boiling solvents are preferred such as pentane, hexane and heptane, which are easily removable by evaporation at relatively low temperature. The concentration of the titanium compound in the solution is not critical and is normally maintained in the order of 2–10% by weight. Such a solution is left in contact with the solid at a temperature between ambient (20°–25° C.) and about 100° C. for a time of between 0.5 and 3 hours, to fix the titanium to an atomic ratio of magnesium to titanium in the solid of between 0.5/1 and 8/1. In the preferred embodiment the operating conditions are a temperature of the order of 60° C. for a time of about 1 hour, to an atomic ratio of magnesium to titanium in the solid of between 3.5/1 and 6.5/1. On termination of the reaction the solid is recovered and dried.

In a preferred embodiment in stage e) of the process, a silicon halide, suitably chosen from silicon tetrahalides and silylhalides (halosilanes), is added.

Specific examples of such compounds are silicon tetrachloride, trichlorosilane, vinyltrichlorosilane, ethoxytrichlorosilane and chloroethyltrichlorosilane. The most preferred compound is silicon tetrachloride.

Particularly the silicon tetrachloride is added in such an amount to have an atomic ratio of silicon to titanium of between 0.5/1 and 8.0/1 and preferably of between 2.0/1 to 6.0/1.

It has been found that the silicon tetrahalides make it possible to improve the catalytic activity and consequently to increase the polyethylene yield.

The solid obtained in stage e) can either itself form the solid catalyst component or be interacted with an alkylaluminium chloride in stage f) of the process so as to increase its chlorine content, cause the partial or total reduction of the titanium from the tetravalent state to the trivalent state, and eliminate part of the alcohols present.

More specifically, said solid from stage e) is suspended in an inert hydrocarbon liquid in stage f) and is brought into contact with an alkylaluminium chloride generally chosen from diethylaluminium chloride, ethylaluminium sesquichloride and diisobutylaluminium chloride, dissolved in the same or a different hydrocarbon solvent.

The hydrocarbons solvents can be chosen from those stated for the preceding stage e). In particular, stage f) of the process is effected with a ratio of chlorine atoms in the alkylaluminium chloride to alkoxy groups in the solid of between 0.5/1 and 7/1, at a temperature of between 10° and 100° C. for a time which depending on the chosen temperature can vary from 10 minutes to 24 hours, to obtain an atomic ratio of chlorine to titanium in the solid of between 10/1 and 16/1. In the preferred embodiment the operation is carried out at a temperature of between 20° and 90° C. for a time of between 10 minutes and 1 hour, to obtain an atomic ratio of chlorine to titanium in the solid of between 12/1 and 14/1. On termination of the treatment the solid catalyst component is recovered, conveniently washed with a liquid aliphatic hydrocarbon solvent until chlorides are no longer present in the wash liquid, and then possibly dried.

The solid catalyst component according to the present invention consists of a particulate silica support (50–90% by weight) and a catalytically active part (50–10% by weight) containing titanium, magnesium and chlorine in addition to alkoxy groups, in the following atomic ratios: Mg/Ti from 0.5/1 to 8.0/1; Cl/Ti from 10/1 to 16/1; alkoxy groups/Ti from 0.5/1 to 4.0/1. These alkoxy groups comprise the ethoxy groups originating from the ethanol and the alkoxy groups deriving from the titanium alkoxide used. In such a catalyst component the titanium quantity varies generally from 0.5 to 4.0% by weight. In the preferred embodiment the solid catalyst component consists of a particulate silica support (60–80% by weight) and a catalytically active part (40–20% by weight) containing titanium, magnesium and chlorine in addition to alkoxy groups, in the following atomic ratios: Mg/Ti from 3.5/1 to 6.5/1; Cl/Ti from 12/1 to 14/1; alkoxy groups/Ti from 2.0/1 to 4.0/1. In this catalyst component the titanium quantity generally varies from 1.5 to 2.5% by weight.

The present invention also relates to a catalyst for ethylene (co)polymerization formed from the aforedescribed solid catalyst component in combination with an aluminium organometallic compound (co-catalyst) chosen from aluminium trialkyls and alkylaluminium halides (especially chlorides) containing from 1 to 5 carbon atoms in the alkyl portion. Of these, those preferred are the aluminium trialkyls with between 2 and 4 carbon atoms in the alkyl portion such as aluminium triethyl, aluminium tributyl and aluminium triisobutyl. The catalyst of the present invention has an atomic ratio of aluminium (in the co-catalyst) to titanium (in the solid catalyst component) generally variable between 20:1 and 200:1 and preferably between 50:1 and 150:1.

Such a catalyst is active in ethylene polymerization and in the copolymerization of ethylene with an alpha-olefin, in polymerizations conducted by the method of suspension in an inert diluent or by the gaseous phase method in a fluidized or agitated bed. The alpha-olefins which can be copolymerized are generally those containing between 3 and 10 carbon atoms and preferably between 4 and 6 carbon atoms, such as 1-butene, 1-hexene and 4-methyl-1-pentene. The general polymerization conditions are temperature between 50° and 100° C., total pressure between 5 and 40 bar, and a ratio of hydrogen to ethylene partial pressure of between 0 and 10. In all cases a high olefin polymer productivity is attained, the polymer obtained having excellent rheology and in particular being in the form of non-friable granules without fines.

The following experimental examples are given to better illustrate the present invention.

EXAMPLE 1

6.01 g (63.1 mmoles) of anhydrous magnesium chloride and 150 ml of absolute ethanol are fed under a nitrogen atmosphere into a 250 ml flask fitted with a reflux condenser, mechanical stirrer and thermometer. The mixture is heated to a temperature of 60° C. for 30 minutes, to completely dissolve the magnesium chloride. 20 g of microspheroidal silica with a particle size of 20 to 100 μm and having the following characteristics:

| | |
|---|---|
| SiO₂ content | 99.5% by weight |
| surface area | 320 m²/g |
| pore volume | 1.7 ml/g |
| mean pore diameter | 26 nm | are suspended in the solution obtained.

This silica is activated before use by heating to about 600° C. for 10 hours in a nitrogen atmosphere.

The suspension is maintained at the temperature of 60° C. for 30 minutes to ensure good impregnation of the silica.

The unabsorbed ethanol is eliminated from the suspension by evaporation at 50° C. under a pressure of 5 mmHg, by which it is evaporated to dryness to recover a solid containing magnesium chloride and ethanol in a molar ratio of about 1/6.

This solid is heated to 120° C. under a pressure of 5 mmHg for 1 hour to partially eliminate the absorbed ethanol by evaporation. After cooling in a stream of nitrogen, a solid is recovered containing magnesium chloride and ethanol in a molar ratio of 1/2.8.

The solid obtained in this manner is suspended in a solution of titanium tetra-n-butoxy (5.56 g; 16.3 mmoles) and titanium tetrachloride (1.03 g; 5.4 mmoles) in 150 ml of anhydrous n-hexane. The reaction is allowed to proceed for 1 hour at 60° C. The mixture is finally evaporated to dryness by evaporating the solvent, to recover a solid containing magnesium and titanium in an atomic ratio of 3.7/1.

This solid is suspended in 130 ml of anhydrous n-hexane, and 33 ml of a 40 wt % solution of aluminum ethyl sesquichloride (10.84 g; 43.8 mmoles) in n-decane are added to the resultant suspension. Contact is maintained for 15 minutes at a temperature of 25° C. Finally, the solid is recovered by filtration, washed with n-hexane and dried by evaporating the solvent.

30 g of a solid catalyst component are obtained in the form of a microspheroidal solid containing 48 wt % of silica, the catalytically active part of which contains magnesium, titanium, chlorine and alkoxy groups (methoxy and n-butoxy).

The solid catalyst component prepared as described is used in a first ethylene polymerization test. Specifically, the polymerization is effected by operating in a 5 liter pressure vessel containing 2 liters of n-hexane. The procedure is carried out at a pressure of 15 bar in the presence of hydrogen, with a hydrogen to ethylene pressure ratio of 0.47/1, at a temperature of 90° C. for a time 2 hours, using 200 mg of the solid catalyst component and aluminium triethyl as co-catalyst, with an atomic ratio of aluminium in the co-catalyst to titanium in the solid catalyst component of 100/1.

A yield of 4.4 kg of polyethylene per gram of solid catalyst component is obtained, the polyethylene obtained having the following characteristics:

| | |
|---|---|
| density (ASTM D-1505) | 0.961 g/ml |
| MFI (2.16 kg) Melt-Flow Index ASTM D-1238) | 4.46 g/10 min |
| apparent density (ASTM D-1895) | 0.35 g/ml |

The polyethylene is in the form of granules with an average size of 500 μm.

EXAMPLE 2

1.88 g (19.7 mmoles) of anhydrous magnesium chloride and 250 ml of absolute ethanol are fed under a nitrogen atmosphere into a 500 ml flask fitted with a reflux condenser, mechanical stirrer and thermometer. The mixture is heated to a temperature of 60° C. for 30 minutes, to completely dissolve the magnesium chloride. 11.36 g of microspheroidal silica of Example 1 used as such, i.e. without any previous activation treatment, are suspended in the obtained solution. Contact is maintained for 1 hour at the temperature of 60° C. to ensure good impregnation of the silica. The unabsorbed ethanol is eliminated from the suspension by evaporation at 50° C. under a pressure of 5 mmHg, by which it is evaporated to dryness to recover a solid containing magnesium chloride and ethanol in a molar ratio of about 1/6.

This solid is heated to 120° C. for 1 hour to partially eliminate the absorbed ethanol by evaporation. After cooling in a stream of nitrogen, a solid is recovered containing magnesium chloride and ethanol in a molar ratio of 1/3.0.

The solid obtained in this manner is suspended in a solution of titanium tetra-n-butoxy (6.60 g; 19.4 mmoles) in 200 ml of anhydrous n-hexane. The reaction is allowed to proceed for 1 hour at 60° C. The mixture is finally evaporated to dryness by evaporating the solvent, to recover a solid containing magnesium and titanium in an atomic ratio of 0.8/1.

This solid is suspended in 50 ml of anhydrous n-hexane, and 11.6 ml of a 40 wt % solution of aluminium ethyl sesquichloride (3.8 g; 15.4 mmoles) in n-decane are added to the resultant suspension. Contact is maintained for 15 minutes at a temperature of 25° C. Finally, the solid is recovered by filtration, washed with n-hexane and dried by evaporating the solvent.

19 g of solid catalyst component are thus obtained in the form of a microspheroidal solid containing 50 wt % of silica, the catalytically active part of which contains magnesium, titanium, chlorine and alkoxy groups (methoxy and n-butoxy), with the following atomic ratios: magnesium/titanium 0.8/1; chlorine/titanium 2.8/1.

The solid catalyst component prepared as described is used in an ethylene polymerization test operating as described in Example 1. A yield of 3.0 kg of polyethylene per gram of solid catalyst component is obtained, the polyethylene obtained having the following characteristics:

| | |
|---|---|
| density | 0.957 g/ml |
| MFI (2.16 kg) | 2.1 g/10 min |
| apparent density | 0.25 g/ml |

The polyethylene is in the form of granules with an average size of 600 μm.

EXAMPLE 3

The solid catalyst component of Example 1 is used in a quantity of 500 mg together with triethylaluminium (aluminium:titanium atomic ratio 100:1) for the polymerization of ethylene in the gaseous phase, in a 5 liter pressure vessel. The polymerization conditions are: total pressure 20 bar, hydrogen partial pressure 6 bar, temperature 90° C., time 2 hours.

To disperse the catalyst a quantity of 270 g of dried magnesium chloride is introduced and is removed from the polymer after the reaction by dissolving in water.

Polyethylene is obtained with a yield of 1.8 kg per gram of solid catalyst component. The polyethylene produced in this manner has an apparent density of 0.32 g/ml, a MFI (2.16 kg) of 4.4 g/10 min and a MFR of 28.7 (MFR=Melt-Flow Index Ratio, defined as the ratio MFI (21.6 kg)/MFI (2.16 kg). The polyethylene is in the form of granules, of which 80% have a diameter of between 250 and 1000 μm.

EXAMPLES 4-8

The procedure of Example 1 is followed, but with the following differences:

in Example 4 the silica of Example 1 is used without any prior activation treatment;

in Example 5 the silica of Example 1 is used, activated by treatment with 5% of triethylaluminium at a temperature of 60° C. for 1 hour;

in Example 6 the silica of Example 1 is used, activated by treatment with 5% by weight of magnesium butyl-octyl at a temperature of 60° C. for 1 hour;

in Examples 7 and 8 the silica of Example 1 is activated by heating it for 5 hours at a temperature of 150° C. in a nitrogen atmosphere.

The following Table 1 shows the composition of the solid catalyst components obtained in Examples 4 to 9 as a weight percentage (% w) of the active components.

TABLE 1

| Example | 4 | 5 | 6 | 7 | 8 |
|---|---|---|---|---|---|
| Mg (% w) | 4.6 | 4.0 | 5.3 | 4.8 | 4.8 |
| Ti (% w) | 2.0 | 1.8 | 2.1 | 2.0 | 2.0 |
| Cl (% w) | 17.0 | 17.4 | 20.6 | 19.4 | 19.4 |

The catalysts of Examples 4 to 8 are used in ethylene polymerization tests operating as described in Example 1, with the exception of Example 8 in which tri-isobutyl aluminium is used as co-catalyst. The following Table 2 shows the polyethylene yields and the characteristics of the obtained polymer. Table 3 shows the particle size distribution, expressed in micrometers, of the polyethylenes obtained in the polymerization tests.

TABLE 2

| Example | 4 | 5 | 6 | 7 | 8 |
|---|---|---|---|---|---|
| Yield | 3.9 | 3.0 | 4.6 | 7.9 | 7.2 |
| MFI | 2.4 | 1.45 | 4.1 | 3.1 | 1.9 |
| MFR | 30.1 | 35.5 | 33.0 | 31.4 | 29.9 |
| App. density | 0.29 | 0.35 | 0.31 | 0.23 | 0.30 |
| Flow-ability | 32 | 25 | 31 | ND | ND |

TABLE 2-continued

| Example | 4 | 5 | 6 | 7 | 8 |
|---|---|---|---|---|---|
| Density | 0.9585 | 0.9613 | 0.9629 | 0.9613 | 0.9603 | where:
"Yield" = grams of polyethylene per gram of solid catalyst component;
"MFI" = Melt-Flow Index at 2.16 kg
"MFR" = MFI (21.6 kg)/MFI (2.16 kg);
"App. density" = apparent density;
"Flowability" is determined by ASTM 1895;
"ND" = not determined.

TABLE 3

| EX. | >2000 | <2000 >1000 | <1000 >500 | <500 >250 | <250 |
|---|---|---|---|---|---|
| 4 | 1.2 | 74.9 | 20.7 | 1.5 | 1.7 |
| 5 | 0.31 | 35.8 | 45.0 | 8.2 | 7.9 |
| 6 | 2.2 | 68.5 | 24.8 | 2.4 | 2.1 |
| 7 | 2.8 | 78.0 | 12.8 | 3.8 | 2.6 |
| 8 | 5.7 | 85.8 | 8.1 | 0.2 | 0.2 |

EXAMPLE 9

The procedure of example 6 is followed, but adding together with tetra-n-butoxy titanium and titanium tetrachloride, 4.4 ml (6.46 g, 38.0 mmoles) of silicon tetrachloride. The mixture is maintained at a temperature of 60° C. for 1 hour and then is evaporated to dryness. After treatment with ethylaluminium sesquichloride, a solid catalyst component is obtained containing 62 wt % of silica, the catalytically active part of which contains magnesium, titanium, chlorine and alkoxy groups, with the following atomic ratios: 7.2:1.0:19:5.4.

The solid catalyst component prepared as described is used in an ethylene polymerization test. Specifically the polymerization is effected by operating in a 5 liter pressure vessel containing 2 liters of n-hexane. The procedure is carried out at a pressure of 15 bar in the presence of hydrogen, with a hydrogen to ethylene pressure ratio of 0.47/1, at a temperature of 90° C. for a time of 2 hours, using 50 mg of the solid catalyst component and triethyl aluminium as co-catalyst, with an atomic ratio of aluminium in the co-catalyst to titanium in the solid catalyst component of 100/1.

A yield of 10.4 kg of polyethylene per gram of solid catalyst component is obtained, the polyethylene thus obtained having the following characteristics:

| | |
|---|---|
| density (ASTM D-1505) | 0.959 g/ml |
| MFI (2.16 kg) (Melt-Flow Index - ASTM D-1238) | 2.2 g/10' |
| apparent density | 0.28 g/ml |

We claim:

1. A process for preparing a solid catalyst component for ethylene polymerization and for the copolymerization of ethylene with an alpha-olefin, consisting of a silica support in particle form (50-90% by weight) and a catalytically active part (50-10% by weight) containing titanium, magnesium, chlorine and alkoxy groups, characterised by:

a) preparing a solution of magnesium chloride in ethanol;

b) impregnating silica particles with the solution from a) by suspending the silica particles in the solution;

c) eliminating the ethanol not absorbed by the suspension in b) by evaporation at a temperature not exceeding 60° C. and recovering a solid in the form of particles containing ethanol and magnesium chloride in a molar ratio of the order of 5/1-6/1;

d) heating the solid from c) to a temperature not exceeding 150° C. and partially eliminating the absorbed ethanol by evaporation to a molar ratio of ethanol to magnesium chloride in the solid of between 1.5/1 and 4/1;

e) interacting the solid from d) with at least one titanium compound chosen from titanium chlorides, alkoxides and chloroalkoxides to an atomic ratio of magnesium to titanium in the solid of between 0.5/1 and 8/1; and f) recovering the solid catalyst component.

2. A process as claimed in claim 1, characterised by operating in stage a) with magnesium chloride and ethanol which are anhydrous or have a water content of less than about 5% by weight, and dissolving the magnesium chloride at a temperature ranging from ambient (20°-25° C.) to the reflux temperature of ethanol at atmospheric pressure, to prepare an ethanolic solution with a magnesium chloride concentration of between 1 and 5% by weight.

3. A process as claimed in claim 1, characterised by using in stage d) a porous microspheroidal silica having a particle size of between 10 and 100 μm, a SiO$_2$ content >90 wt %, a surface area of between 250 and 400 m$^2$/g, a pore volume of between 1.3 and 1.8 ml/g, and a mean pore diameter of between 20 and 30 nm.

4. A process as claimed in claim 3, characterised in that said silica has a particle size of between 10 and 100 μm, a SiO$_2$ content >99 wt %, a surface area of between 300 and 340 m$^2$/g, a pore volume of between 1.5 and 1.7 ml/g, and a mean pore diameter of between 24 and 27 nm.

5. A process as claimed in claim 4, characterised in that said silica is subjected to activation pretreatment by heating in an inert atmosphere to a temperature from about 100° C. to about 650° C. for a time of between 1 and 20 hours.

6. A process as claimed in claim 1, characterised in that in stage b) between 10 and 20 parts by weight of silica are suspended per 100 parts by volume of the ethanolic solution of magnesium chloride, contact being maintained at a temperature between ambient (20°-25° C.) and close to the boiling point of ethanol for a time of between 0.5 and 2.0 hours.

7. A process as claimed in claim 1, characterised in that in stage c) the unabsorbed ethanol is eliminated from the suspension by evaporation at a temperature of between 30° and 60° C. operating at atmospheric pressure or at reduced pressure down to about 1 mmHg, a particulate solid being recovered containing ethanol and magnesium chloride in a molar ratio of the order of 5/1-6/1.

8. A process as claimed in claim 1, characterised in that in stage d) the absorbed ethanol is partially eliminated by evaporation at a temperature not exceeding 150° C. at atmospheric pressure or at reduced pressure down to 1 mmHg for a time of between about 0.5 and about 5 hours until a molar ratio of ethanol to magnesium chloride in the solid of between 2.0/1 and 3.5/1 is reached.

9. A process as claimed in claim 1, characterised in that in stage e) the solid is interacted with at least one compound chosen from titanium chlorides, titanium alkoxides and titanium chloroalkoxides, operating with the titanium compound dissolved in an inert vehicle, with a concentration of the titanium compound in the solution of the order of 2-10 wt %, at a temperature of between ambient (20°-25° C.) and about 100° C., for a time of between 0.5 and 3 hours, with an atomic ratio of magnesium to titanium in the solid of between 3.5/1 and 7.5/1.

10. A process as claimed in claim 9, characterised by adding in stage e) a silicon halide chosen from silicon tetrahalides and halosilanes in such an amount to have an atomic ratio of silicon to magnesium of between 0.5/1 to 8.0/1.

11. A process as claimed in claim 10, characterised by choosing said silicon halide from silicon tetrachlorides, trichlorosilane, vinyltrichlorosilane, trichloroethoxysilane and chloroethyltrichlorosilane, with an atomic ratio of silicon to titanium of between 2.0/1 and 6.0/1.

12. A process as claimed in claim 1, characterised in that the solid catalyst component consists of a particulate silica support (50–90% by weight) and a catalytically active part (50–10% by weight) containing titanium, magnesium and chlorine in addition to alkoxy groups, in the following atomic ratios: Mg/Ti from 0.5/1 to 8.0/1; Cl/Ti from 10/1 to 16/1; alkoxy groups/Ti from 0.5/1 to 4.0/1, with a titanium content from 0.5 to 4.0% by weight.

13. A process as claimed in claim 12, characterised in that the solid catalyst component consists of a particulate silica support (60–80% by weight) and a catalytically active part (40–20% by weight) containing titanium, magnesium and chlorine in addition to alkoxy groups, in the following atomic ratios: Mg/Ti from 3.5/1 to 6.5/1; Cl/Ti from 12/1 to 14/1; alkoxy groups/Ti from 2.0/1 to 3.0/1, with a titanium content from 1.5 to 2.5% by weight.

14. A process as claimed in claim 1, further comprising step e)′ interacting the solid from e) with an alkyaluminum chloride to an atomic ratio of chlorine to titanium in the solid of between 10/1 and 16/1.

15. A process as claimed in claim 14, characterised by operating in stage f) with diethylaluminium chloride, ethylaluminium sesquichloride or diisobutylaluminium chloride, with a ratio of chlorine atoms in the alkylaluminium chloride to alkoxy groups in the solid of between 0.5/1 and 7/1, at a temperature of between 10° and 100° C. for a time of between 10 minutes and 24 hours, and preferably at a temperature of between 20° and 90° C. for a time of between 10 minutes and 1 hour, to obtain an atomic ratio of chlorine to titanium in the solid of between 12/1 and 14/1.

16. A process as claimed in claim 2, wherein the magnesium chloride is dissolved at a temperature ranging from about 60° C. up to the reflux temperature of ethanol at atmospheric pressure.

17. A process as claimed in claim 4, wherein the silica is subjected to activation pretreatment by undergoing contact with an organometallic compound operating at ambient temperature or higher than ambient temperature up to about 100° C.

18. A process as claimed in claim 6, wherein the contact is maintained at a temperature between about 50°-65° C.

19. A process as claimed in claim 9, wherein the titanium compound is selected from titanium tetrachloride, titanium tetra-n-propoxy, titanium tetra-n-butoxy, titanium tetra-i-propoxy, titanium tetra-i-butoxy, and the corresponding titanium mono- or di-chloroalkoxides.

20. A process as claimed in claim 9, wherein the interaction takes place at a temperature of the order of 60° C. for a time of about one hour.

21. A process as claimed in claim 15, wherein step f) is performed at a temperature of between 20° and 90° C. for time of between 10 minutes and one hour.

* * * * *

UNITED STATES PATENT AND TRADEMARK OFFICE
CERTIFICATE OF CORRECTION

PATENT NO. : 5,173,465

DATED : December 22, 1992

INVENTOR(S) : Luciano Luciani et al.

It is certified that error appears in the above-identified patent and that said Letters Patent is hereby corrected as shown below:

Column 10:

In Claim 15, in lines 8-9, "and preferably at a temperature of between 20° and 90°C. for a time of between 10 minutes and 1 hour," should be deleted".

Signed and Sealed this

Twenty-fifth Day of January, 1994

Attest:

BRUCE LEHMAN

*Attesting Officer*   *Commissioner of Patents and Trademarks*